May 5, 1931.     M. M. RODIN     1,803,560
FISHHOOK OR CATCHING DEVICE
Filed Sept. 17, 1929     2 Sheets-Sheet 1
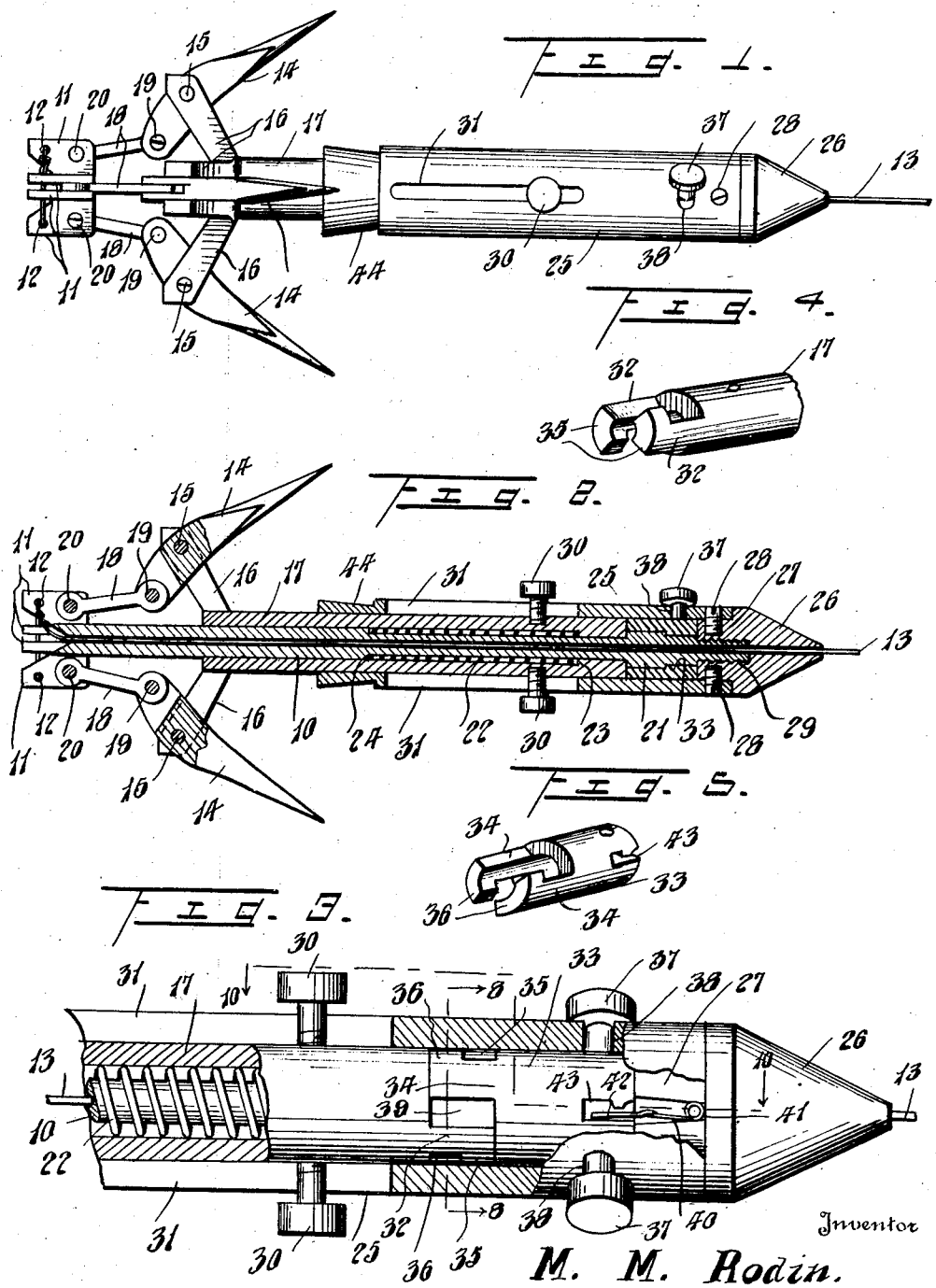
Inventor
M. M. Rodin.
By L. F. Randolph Jr.
Attorney May 5, 1931. M. M. RODIN 1,803,560
FISHHOOK OR CATCHING DEVICE
Filed Sept. 17, 1929 2 Sheets-Sheet 2
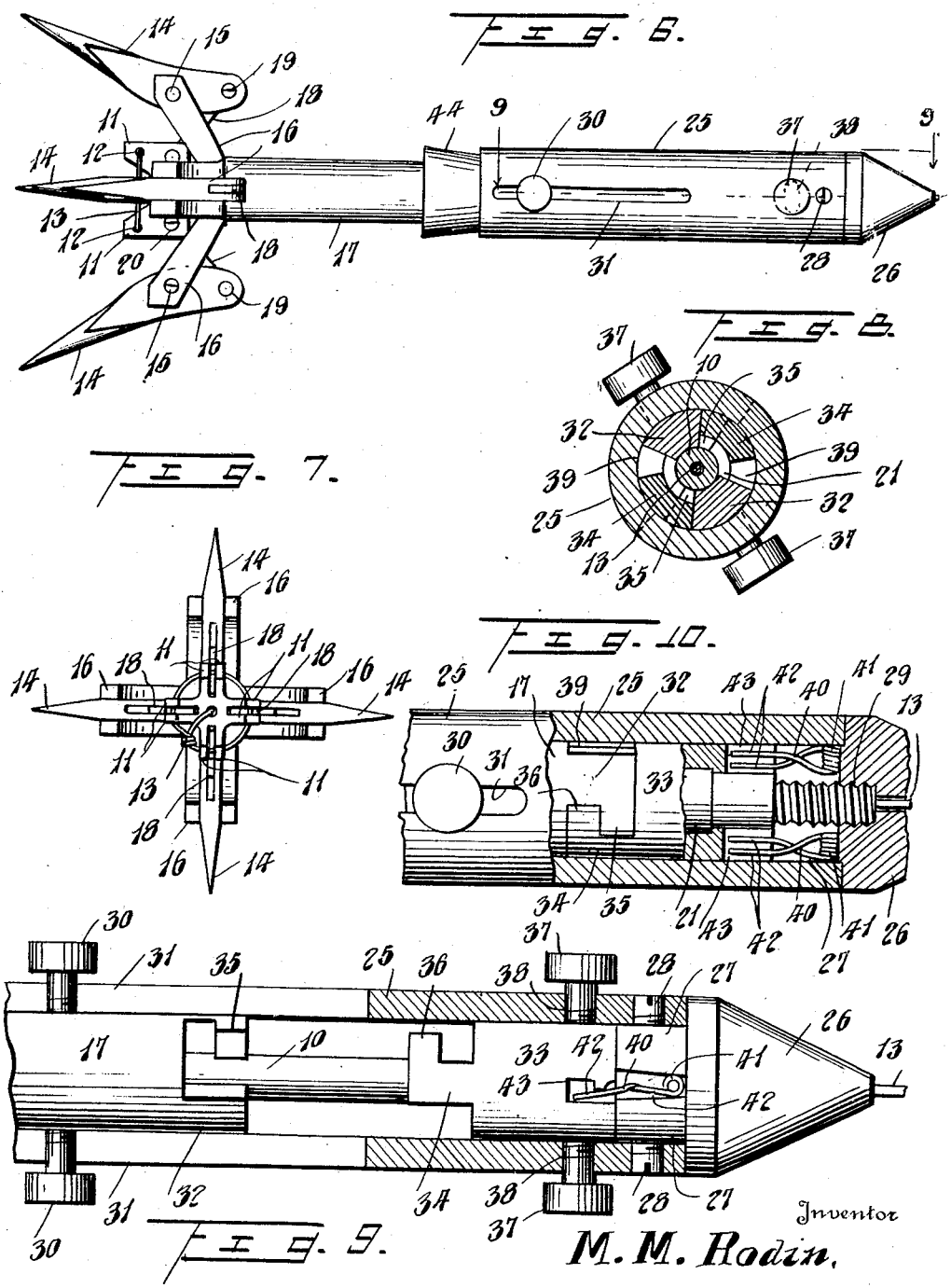
Inventor
M. M. Rodin.

Patented May 5, 1931

1,803,560

UNITED STATES PATENT OFFICE

MATE MIKE RODIN, OF SAN PEDRO, CALIFORNIA

FISHHOOK OR CATCHING DEVICE

Application filed September 17, 1929. Serial No. 393,138.

This invention relates to a fish hook or catching device.

It is aimed to provide a novel construction wherein the hook may be reversed in order to extract the device from the mouth of a fish.

It is also aimed to provide a novel, durable and compact construction accomplishing the end and one which will prove durable in use.

One operative embodiment has been illustrated in the accompanying drawings wherein:—

Figure 1 is a view of the device in elevation;

Figure 2 is a substantially central longitudinal sectional view through the device, Figure 3 is an enlarged longitudinal sectional view through the upper portion of the device, Figure 4 is a detail perspective view of the upper portion of the actuating sleeve, Figure 5 is a detail perspective view of the detent which coacts with said actuating sleeve, Figure 6 is an elevation of the device with the parts in reverse position to that shown in Figure 1, Figure 7 is an inverted plan view of the device, Figure 8 is a cross sectional view taken on the line 8—8 of Figure 3, Figure 9 is a fragmentary longitudinal sectional view through the upper end of the device showing the detent and actuating sleeve disconnected, and Figure 10 is a longitudinal sectional view taken on the line 10—10 of Figure 3.

Referring specifically to the drawings, wherein like reference characters designate like or similar parts, 10 designates a rod at the lower end of which integral radiating ribs 11 extend in pairs, and which are provided with openings 12. The device is hollow or provided with a central opening extending through the rod 10 so that a wire or the fishing line 13 may extend therethrough and be fastened in the openings 12.

Catching members 14 in the form of hooks, barbs, or spurs are pivotally connected by pins at 15 to and between arms 16 radiating from an actuating sleeve 17 which is slidable along the rod 10. At one end, catching members 14 have links 18 pivoted thereto as at 19 and which links in turn at 20 are pivoted to the ribs 11, each link extending between a pair of such ribs.

The rod 10 has an enlargement 21 thereon providing a shoulder against which the upper end of actuating sleeve 17 normally abuts. Said sleeve 17 is urged to and maintained in such position through the action of an expansive coil spring 22 which surrounds the rod 10 and abuts a shoulder 23 on the upper end of actuating sleeve 17 and a shoulder 24 on said rod 10.

A tubular barrel 25 is mounted against sliding movement and against rotation on the rod 10. To this end, the barrel 25 may have a cap 26 formed with an extension 27 telescoped into the barrel 25 and fastened thereto by screws 28. Said cap 26 is also screwthreaded onto the upper reduced screwthreaded end 29 of the rod 10.

Manipulating elements which may be in the form of screws 30 extend through elongated slots 31 provided in the barrel 25 and are threaded to the actuating sleeve 17. Such manipulating members 30 may be engaged and moved longitudinally of the barrel to thereby move the catching members 14 from the position shown in Figures 1 and 2 to that shown in Figure 6, that is, reverse the angle or position of the catching members in order to extract the device from the mouth of a fish. Said catching members 14 and actuating sleeve 17 are restored and urged to normal position, namely that of Figures 1 and 2, by the action of spring 22.

Normally the actuating sleeve 17 is incapable of movement along the rod 10 and hence the catching members 14 are normally held in the position of Figures 1 and 2 against danger of accidental displacement therefrom.

As detailed in Figure 4 the upper end of the actuating sleeve 17 is cut away in order to provide a pair of hook-shaped extensions or lugs 32.

Disposed within the barrel 25 adjacent the cap 26 is a tubular detent as detailed in Figure 5 and generally designated 33. Such detent has limited rotation to the adjacent portions of the rod 10 and it has hook-shaped extensions or lugs 34 similar to those at 32. The lugs 32 and 34 are of such size that they may interengage, with their lateral portions 35 and 36, respectively, in overlapping or hooked relation. When in this position, the actuating sleeve 17 is detained against longitudinal movement on the rod 10. The detent 33 is adapted for limited rotary movement and to this end screws 37 may be screwed thereto and extend through laterally arcuate slots 38 provided in the barrel 25. The members 37 in one extreme of movement as shown in Figure 3, disposes said portions 35 and 36 in hooked engagement. At the other extreme of movement of the detent 33, the hook portions 35 and 36 are disengaged, a clearance, as at 39, being provided for this purpose between them, thus releasing the actuating sleeve 17 so that it may be longitudinally actuated through manipulation of the elements 30.

The detent is normally urged to and maintained in locking engagement with the actuating sleeve through the action of spring devices 40 which may have coils 41 suitably anchored to the portion 27 of the cap and have arms 42 extending therefrom and into slots 43 at the upper end of the detent. Said springs 40 urge the detent to the position shown in Figure 3.

The device disclosed is primarily adapted for trolling purposes and in order to accommodate the feathers or equivalent means usually employed to extend over the catching members 14 the lower end of the barrel 25 is preferably reduced as at 44. It will also be realized that the barrel 25 is preferably made of a shiny and bright metal or other material which will serve as a lure for the fish.

Various changes may be resorted to provided they fall within the spirit and scope of the invention.

What is claimed is:—

1. A fishing device of the class described having a catching member including pivotally mounted spurs, and means pivotally secured to said spurs to reverse their positions.

2. A fishing device of the class described having a rod, a catching member including spurs pivoted thereto, and means movable along the rod and pivotally secured to said spurs to reverse the position of said spurs relatively to said means, for the purpose specified.

3. A fishing device of the class described having a rod, a catching member including spurs pivoted thereto, a member movable along the rod and pivotally secured to said spurs to reverse the position of said spurs relatively to said movable member, and means normally urging said movable and catching members to catching position.

4. A fishing device of the class described comprising a rod, catching means including spurs pivoted thereto, a member movable along the rod and pivotally secured to said spurs to reverse the position of said spurs relatively to said movable member, and means to normally prevent movement of the said movable member.

5. A fishing device of the class described comprising a rod, catching means including spurs pivoted thereto, a member movable along the rod and pivotally connected to said spurs to reverse the position of said spurs relatively to said movable member, and means to normally prevent movement of said movable member, said means and said member having interengageable parts capable of disengagement.

6. A fishing device of the class described having catching means including pivotally mounted spurs, means operable along the catching means and pivotally connected to said spurs to reverse them to fish-releasing position, and a detent means normally preventing movement of the last mentioned means, said detent means being operable to release the first mentioned means.

7. A fishing device comprising a rod, catching means, links connected to the rod, an actuating sleeve to which the catching means is pivoted, said sleeve being slidable along the rod to move the catching means to fish-releasing position, spring means between the rod and sleeve coacting therewith to normally maintain the catching means in fishing position, a barrel surrounding the sleeve, a cap on said barrel secured to said rod, and detent means within the barrel adjacent said cap coacting with the actuating sleeve to normally prevent movement thereof.

8. A fishing device comprising a rod, catching means, links connected to the rod, an actuating sleeve to which the catching means is pivoted, said sleeve being slidable along the rod to move the catching means to fish-releasing position, spring means between the rod and sleeve coacting therewith to normally maintain the catching means in fishing position, a barrel surrounding the sleeve, a cap on said barrel secured to said rod, and detent means within the barrel adjacent said cap coacting with the actuating sleeve to normally prevent movement thereof, said detent means and sleeve having interengaging hook means adapted for disengagement through rotation of the actuating sleeve.

9. A fishing device comprising a rod, catching means, links connected to the rod, an actuating sleeve to which the catching means is pivoted, said sleeve being slidable along the rod to move the catching means to fish-releasing position, spring means between the rod and sleeve coacting therewith to normally maintain the catching means in fishing position, a barrel surrounding the sleeve, a cap on said barrel secured to said rod, and detent means within the barrel adjacent said cap coacting with the actuating sleeve to normally prevent movement thereof, said detent means and sleeve having interengaging hook means adapted for disengagement through rotation of the actuating sleeve, said barrel having a laterally arcuate slot engaged by the latter means, said barrel having a longitudinal slot and a projection extending through said slot to said sleeve to enable operation of the latter.

10. A fishing device comprising a rod, catching means, links connected to the rod, an actuating sleeve to which the catching means is pivoted, said sleeve being slidable along the rod to move the catching means to fish-releasing position, spring means between the rod and sleeve coacting therewith to normally maintain the catching means in fishing position, a barrel surrounding the sleeve, a cap on said barrel secured to said rod, and detent means within the barrel adjacent said cap coacting with the actuating sleeve to normally prevent movement thereof, said detent means and sleeve having interengaging hook means adapted for disengagement through rotation of the actuating sleeve, said barrel having a laterally arcuate slot engaged by the latter means, said barrel having a longitudinal slot and a projection extending through said slot to said sleeve to enable operation of the latter, said cap telescoping into said barrel and being screw-threaded to the rod, and a spring means between the detent and said telescoped portion urging the detent into engaged position.

In testimony whereof I affix my signature.

MATE MIKE RODIN.